May 5, 1970 W. L. STELTER 3,510,615

ADJUSTABLE MOUNTING MEANS FOR SPEED RESPONSIVE SWITCH

Filed Oct. 10, 1967

5 Sheets-Sheet 1

Inventor
WILLIAM L. STELTER
by Mason, Kolehmainen, Rathburn and Wyss
Att'ys.

ADJUSTABLE MOUNTING MEANS FOR SPEED RESPONSIVE SWITCH

Filed Oct. 10, 1967 5 Sheets-Sheet 2

Inventor
WILLIAM L. STELTER
by Mason, Kolehmainen, Rathburn and Wyss.
Att'ys.

May 5, 1970 W. L. STELTER 3,510,615

ADJUSTABLE MOUNTING MEANS FOR SPEED RESPONSIVE SWITCH

Filed Oct. 10, 1967 5 Sheets-Sheet 3

Inventor
WILLIAM L. STELTER
by Mason, Kolehmainen, Rathburn and Wyss
Att'ys.

Inventor
WILLIAM L. STELTER
by
Mason, Kolehmainen, Rathburn and Wyss.
Att'ys.

ADJUSTABLE MOUNTING MEANS FOR SPEED RESPONSIVE SWITCH

Filed Oct. 10, 1967

Inventor
WILLIAM L. STELTER
by Mason, Kolehmainen, Rathburn and Wyss
Att'ys.

United States Patent Office 3,510,615
Patented May 5, 1970

3,510,615
ADJUSTABLE MOUNTING MEANS FOR SPEED RESPONSIVE SWITCH
William L. Stelter, 8244 N. Keeler Ave., Skokie, Ill. 60076
Filed Oct. 10, 1967, Ser. No. 674,346
Int. Cl. H01h 35/10
U.S. Cl. 200—80 17 Claims

ABSTRACT OF THE DISCLOSURE

A speed responsive switching device comprising, a housing and a shaft rotatably mounted therein. A speed responsive device is mounted for rotation with said shaft and actuator means is mounted for axial translation on the shaft and is engaged by the speed responsive device to move the actuator means back and forth in response to the speed of the shaft. At least one electrical switch is mounted in the housing including a switch operator which is engaged by the actuator means when said shaft reaches a predetermined speed of rotation. The switch is adjustably supported from one wall of the housing and is movable toward and away from the actuator by means of an adjusting member which is accessible from the exterior of the housing. By movement of the switch to the desired position, the shaft speed at which the switch is actuated is adjustably controlled.

The present invention relates to a new and improved speed responsive switching device and, more particularly, relates to a governor assembly including a housing and a rotating shaft with mechanism on the shaft responsive to the speed thereof for actuating one or more switches in the housing in response to the shaft reaching predetermined speeds of rotation.

In many applications it is desirable to provide a switching device which is operable to effect electrical switching action in response to a rotating member reaching a predetermined speed. In many instances it is required that the switching action be accomplished within a precise speed range and, accordingly, it is desirable to provide means for adjusting the mechanism to insure that the switching action always takes place at the desired speed within a narrow tolerance range.

It is an object of the present invention to provide a new and improved speed responsive switching device.

It is an object of the present invention to provide a new and improved speed responsive switching device of the character described which accomplishes the foregoing desires. Another object is to provide such a device which is adjustable so that the switch therein can be actuated precisely upon the shaft reaching a selected narrow speed range.

Another object of the present invention is the provision of a new and improved speed responsive switching device wherein new and improved means are provided for adjustably mounting a switch within the housing and for precisely moving or adjusting the position of the switch to insure that switch actuation takes place at the desired precise shaft speed.

Another object of the present invention is the provision of a new and improved speed responsive switching device having new and improved means for mounting a switch within the housing so that the position of the switch can be adjusted from externally of the housing without the necessity of opening or disassembling the housing to gain access to the interior thereof.

Another object of the present invention is the provision of a new and improved speed responsive switching device employing several switches and including new and improved means for precisely governing the actuation of the several switches at precisely controlled speeds, respectively.

Yet another object of the invention is the provision of a new and improved multiswitch speed responsive device including new and improved means for adjustably mounting the switches within a housing so that actuation of each switch at the precisely desired shaft speed can be accurately and precisely controlled from exteriorly of the housing.

Another object of the present invention is the provision of a speed responsive governor mechanism having a first speed range wherein movement of an actuator in response to changes in shaft speed is at one rate and a second speed range wherein a movement of the actuator is a different rate.

Another object of the present invention is the provision of a new and improved centrifugal governor mechanism having a first speed range wherein centrifugal force on a pair of pivotally mounted weights caused by shaft rotation is opposed by spring means having one deflection rate and a second speed range wherein spring means having a different deflection rate opposes the centrifugal force caused by shaft rotation.

Another object of the present invention is the provision of a new and improved centrifugal governor system employing an actuator mounted for axial translation on a shaft and movable at one rate in response to speed change of the shaft in a first speed range and a second different rate in response to shaft speed change in a second speed range.

The foregoing and other objects and advantages of the present invention are provided by a new and improved speed responsive switching device including, in combination, a housing with a rotating shaft projecting into said housing. A speed responsive, centrifugal force actuated device is mounted for rotation with the shaft, and switch actuator means is mounted for axial translation on the shaft. The switch actuator means is connected with the speed responsive device and is moved in response to shaft speed to actuate a switch mounted in the housing. The switch includes an operator which is engaged by the actuator means when the shaft reaches a predetermined speed and the switch is adjustably mounted and can be moved so that the shaft speed at which the switch is actuated may be precisely selected and controlled. The mounting assembly for the switch includes an adjusting member which is accessible from the exterior of the housing so that opening or disassembly of the housing is not required in order to readjust the point at which the switch will be actuated.

Another aspect of the invention is the provision of a speed responsive device employing more than one switch, wherein a first switch is actuated upon the shaft reaching a first selected speed and a second switch actuated upon the shaft reaching a second selected speed. The multiswitch device preferably includes a centrifugally actuated governor mechanism operable to move an actuator means at a first rate of translation in response to shaft speed changes in a first speed range and at a second rate of translation in response to changes in shaft speed in a second speed range.

For a better understanding of the present invention, reference should be had to the following detailed description taken in conjunction with the drawings, in which:

FIG. 1 is a perspective view of a new and improved speed responsive switching device constructed in accordance with the features of the present invention;

FIG. 2 is a sectional view of the device taken substantially along line 2—2 of FIG. 1;

FIG. 3 is a side elevational view of the device of

Figures 1, 2, 3:
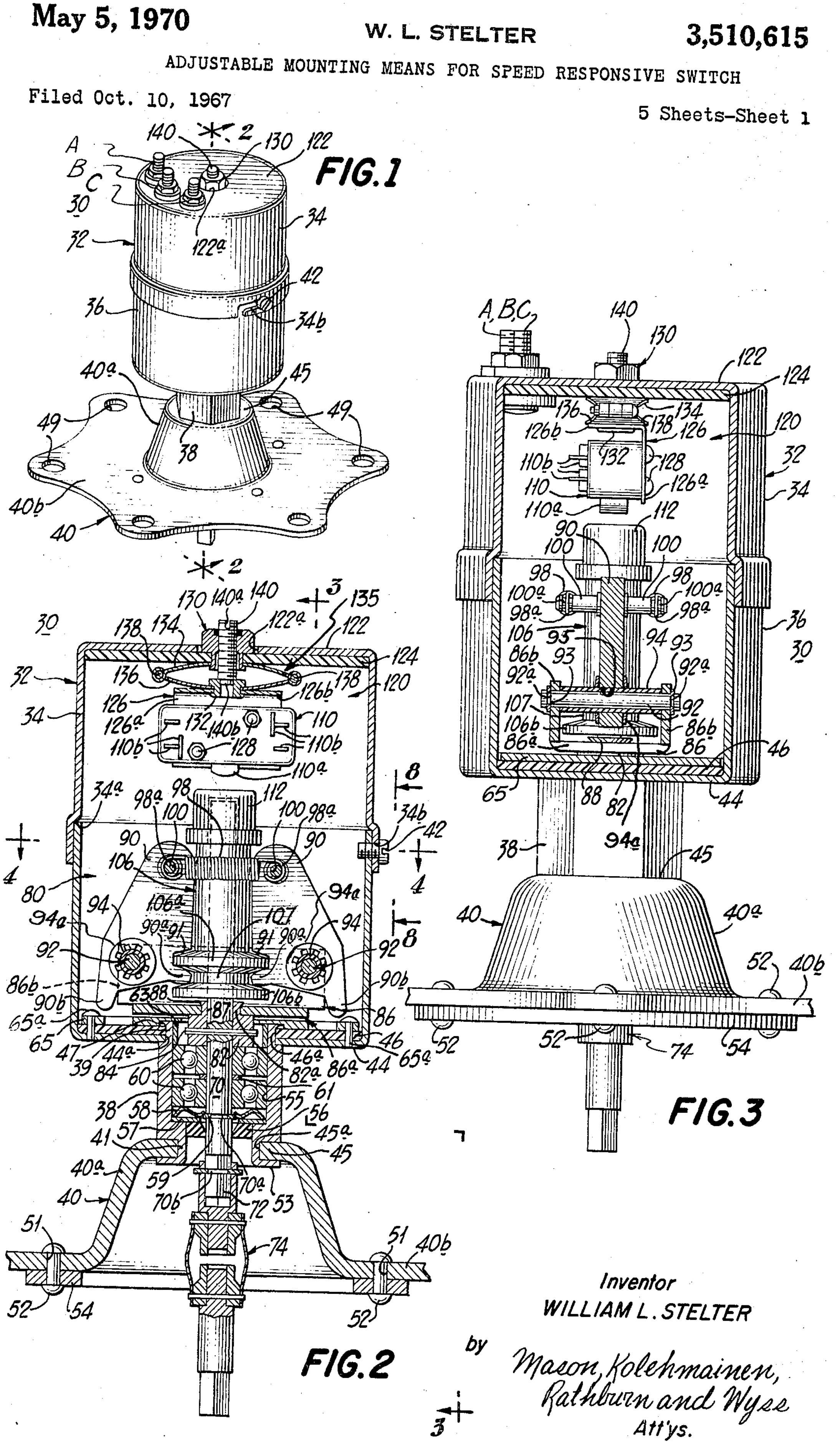
Figures 4, 5, 6, 7, 8:
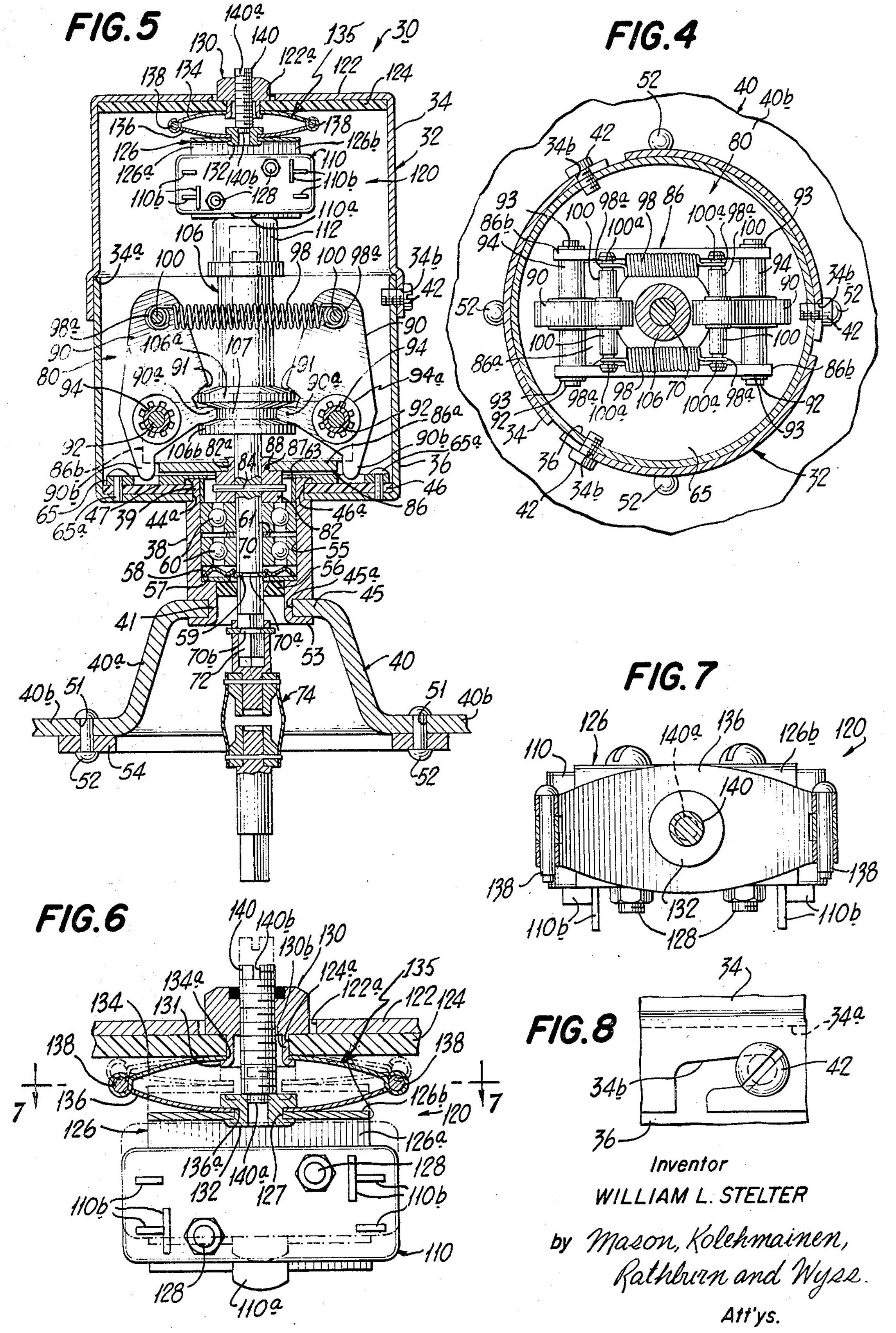
Figures 9, 10, 11:
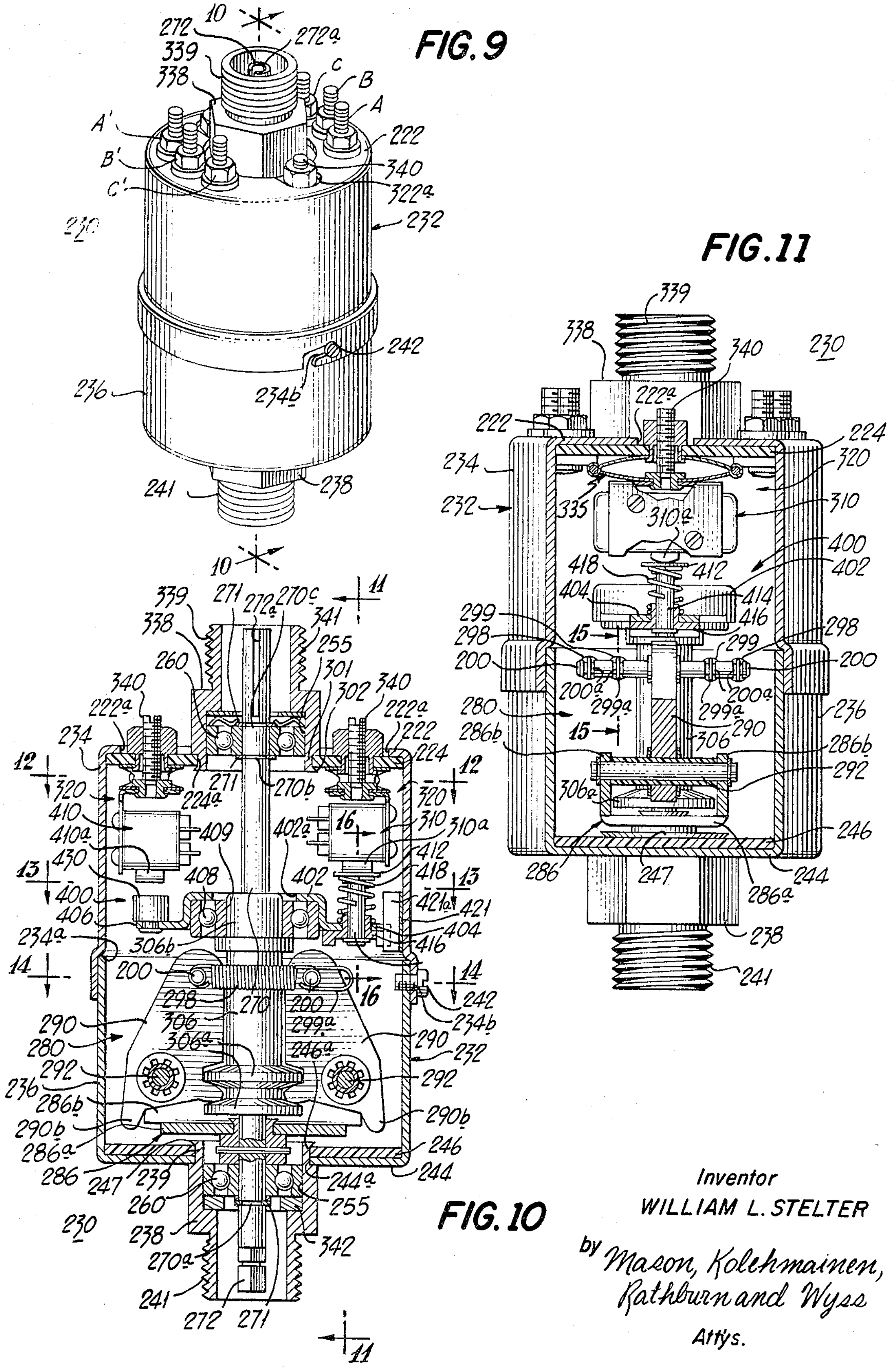
Figure 12:
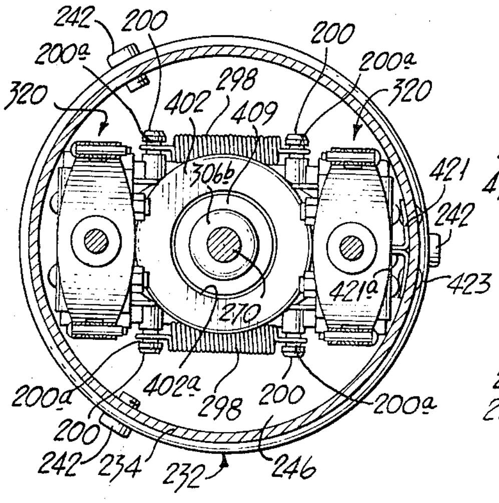
Figure 13:
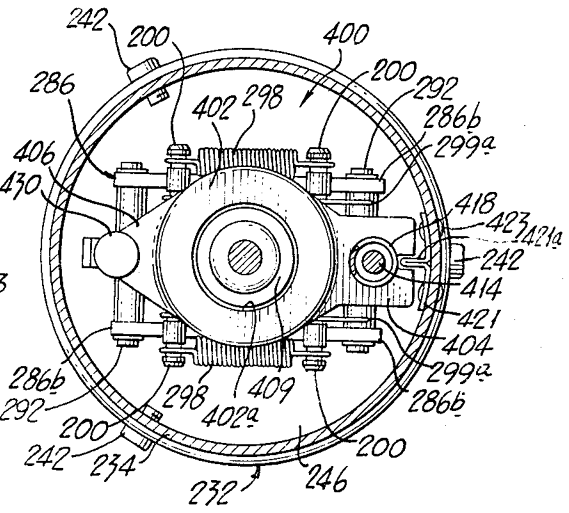
Figures 14, 15, 17:
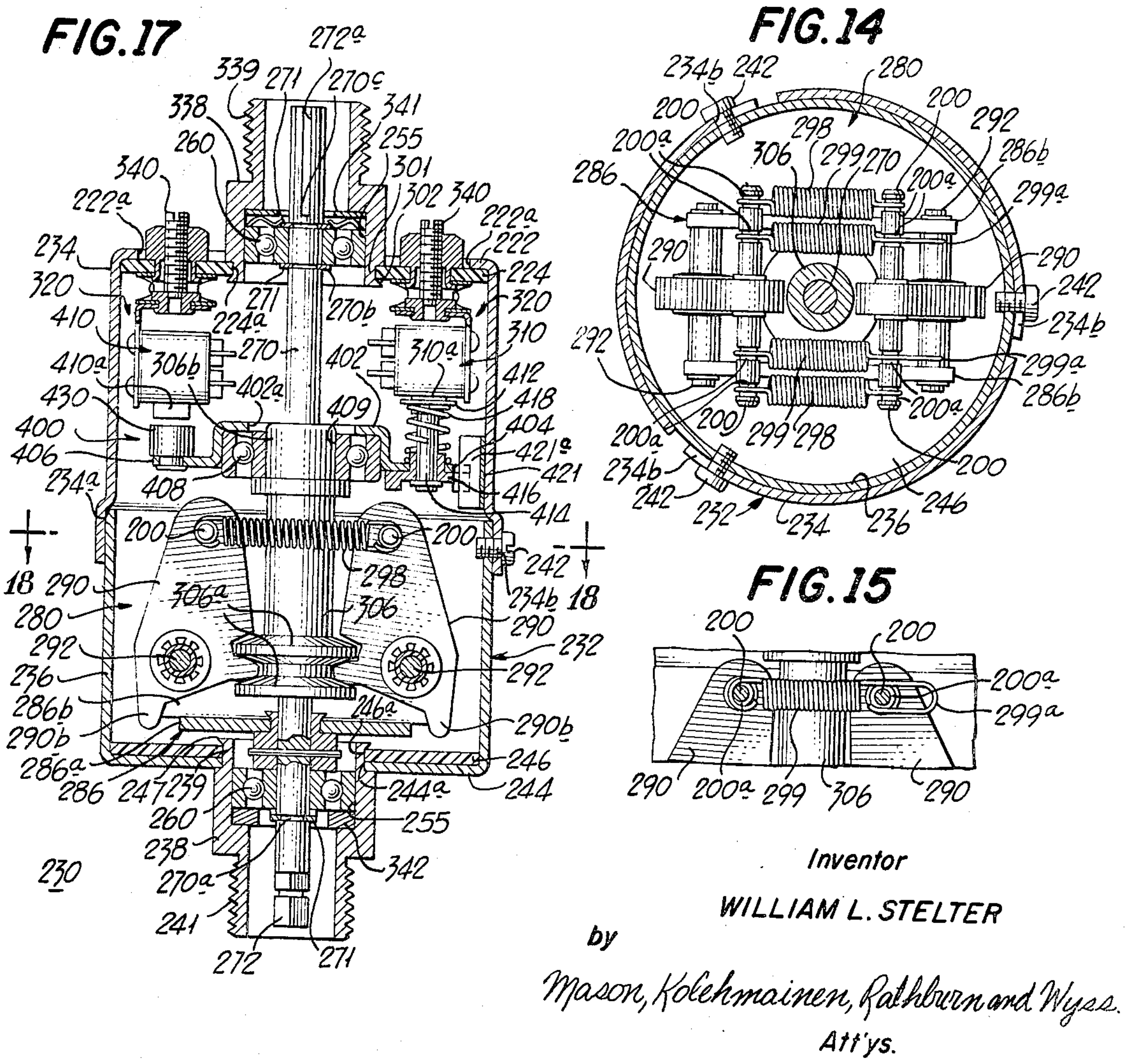
Figures 18, 19, 20:
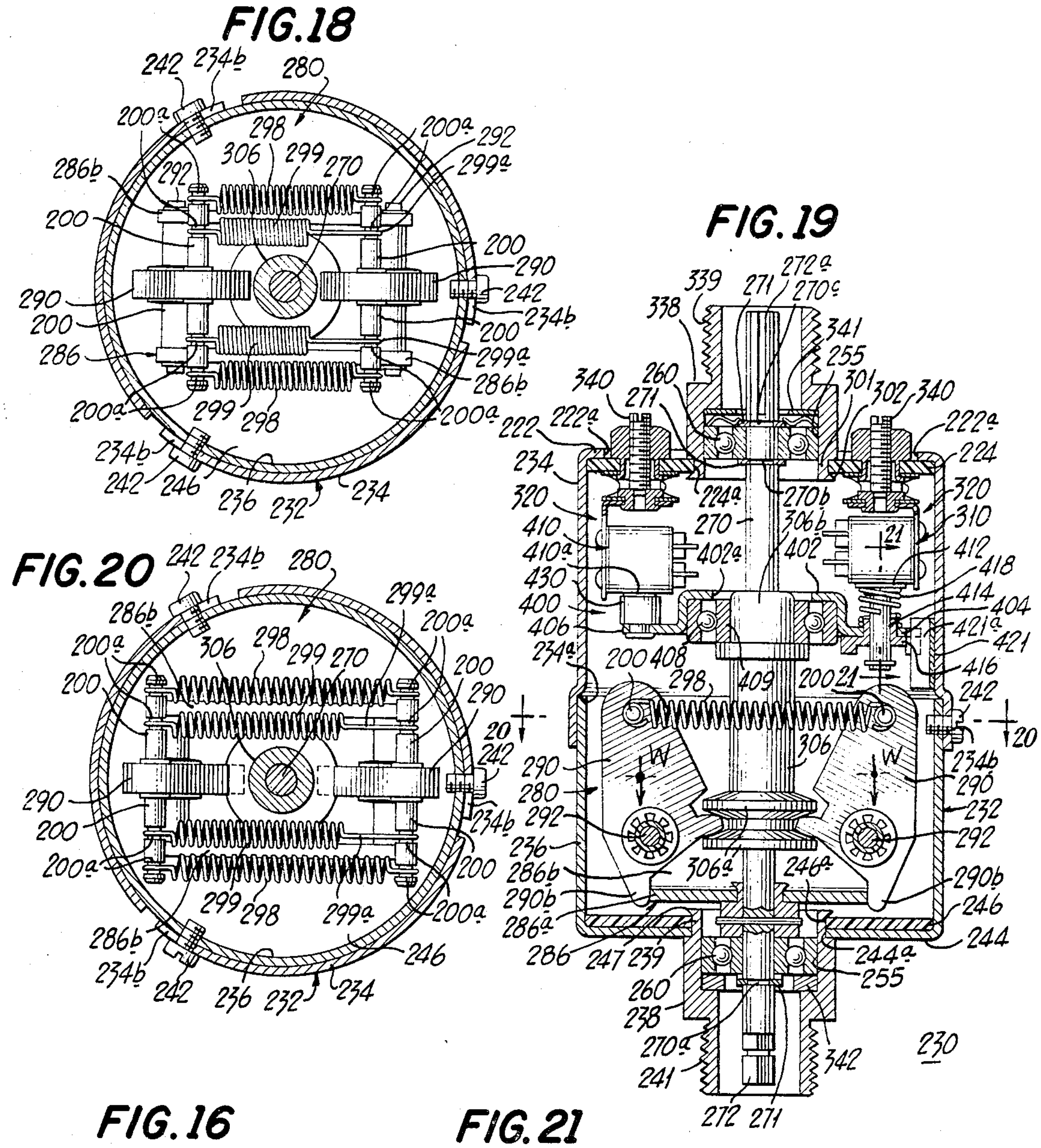
Figure 16:
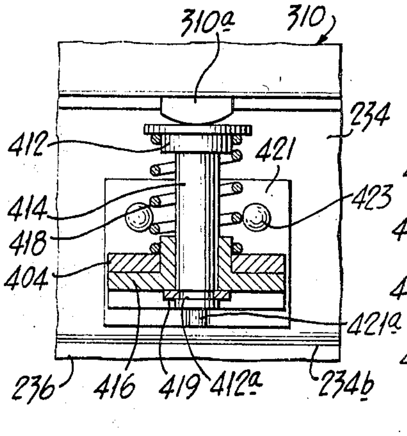
Figure 21:
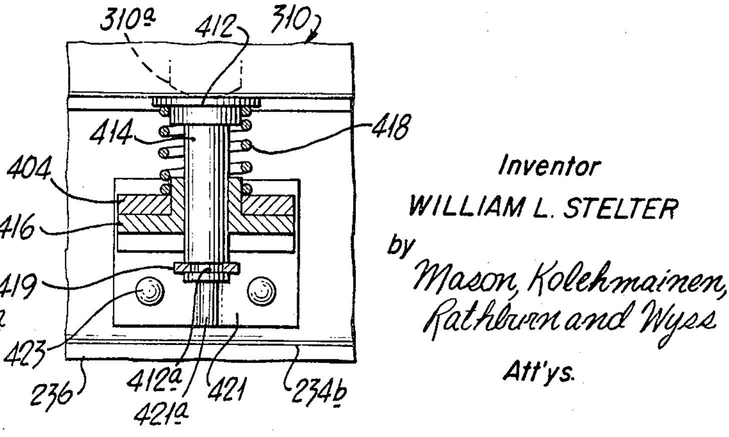

FIG. 1 with portions of the housing broken away to show components in the interior thereof;

FIG. 4 is a transverse cross-sectional view taken substantially along line 4—4 of FIG. 2;

FIG. 5 is a sectional view similar to FIG. 2 but showing the device in another of its operative positions;

FIG. 6 is an enlarged, fragmentary, elevational view showing in detail the new and improved mounting assembly for supporting a switch within the housing of the device;

FIG. 7 is a sectional view taken substantially along line 7—7 of FIG. 6;

FIG. 8 is an enlarged, fragmentary, side elevational view looking at the exterior of the housing in the direction of arrows 8—8 of FIG. 2;

FIG. 9 is a perspective view of another embodiment of a speed responsive switching device constructed in accordance with the features of the present invention;

FIG. 10 is a sectional view of the device taken substantially along line 10—10 of FIG. 9;

FIG. 11 is a side elevational view of the device of FIG. 9 with portions of the housing broken away showing components in the interior thereof;

FIG. 12 is a transverse cross-sectional view taken substantially along line 12—12 of FIG. 10;

FIG. 13 is a transverse cross-sectional view taken substantially along line 13—13 of FIG. 10;

FIG. 14 is a transverse cross-sectional view taken substantially along line 14—14 of FIG. 10;

FIG. 15 is a fragmentary, sectional view taken substantially along line 15—15 of FIG. 11;

FIG. 16 is a fragmentary, enlarged, sectional view showing in detail a switch actuating assembly in one of its operative positions and taken substantially along line 16—16 of FIG. 10;

FIG. 17 is a sectional view, similar to FIG. 10 but showing in detail a switch actuating assembly in one of FIG. 18 is a transverse sectional view taken substantially along line 18—18 of FIG. 17;

FIG. 19 is a sectional view similar to FIG. 17 but showing the device in yet another of its operative positions;

FIG. 20 is a transverse sectional view taken substantially along line 20—20 of FIG. 19; and FIG. 21 is a view similar to FIG. 16 but showing the switch actuating device in another of its operative positions.

Referring now, more particularly, to the drawings and specifically to the embodiment shown in FIGS. 1 through 9, therein is illustrated a new and improved speed responsive switching device 30 constructed in accordance with the present invention. The device 30 includes a housing 32 comprising an upper cuplike member 34 and a lower cuplike member 36. The lower cup member 36 is connected to a tubular coupling 38 which is mounted on a flanged support base 40 having an inverted upper cuplike portion *40a* and a lower flange *40b*.

The upper cup member 34 is formed with an enlarged, internal, annular shoulder *34a* around its lower open end which is adapted to receive and sealingly abut against the upper open end of the lower cup member 36 when the members are assembled together (FIG. 2). As best shown in FIG. 8, a plurality of screws 42 are positioned at radially spaced positions adjacent the open upper end of the lower cup member 36, and the screws extend radially inwardly into threaded apertures in the sidewall of the lower cup through L-shaped slots *34b* (FIGS. 1 and 8) formed at appropriate positions on the upper cup member 34 adjacent the lower open end. After axially aligning the upper cup 34 on the lower cup 36 with the screws 42 in the respective slots *34b* and then rotating the upper cup relative to the lower cup, the cup members are positively locked together, forming a dust tight enclosure with the upper end of the lower cup member seated against the internal annular shoulder *34a* of the upper member. As shown in FIG. 8, transverse portions of the slots *34b* slope slightly upwardly with respect to the horizontal so that when one cup member is rotated relative to the other, tight seating engagement of the upper end of the lower cup against the shoulder *34a* is obtained. Disassembly is accomplished by reverse rotation and upward withdrawal of the upper cup 34, thus leaving the interior of both cup members open.

The lower cup member 36 includes a circular bottom wall 44 having a central aperture *44a* therein, and the upper end of coupling sleeve 38 projects upwardly through the aperture *44a* and through a similar, aligned opening *46a* formed in a washerlike bottom wall stiffening member 46 secured to the inside surface of the bottom wall. The upper portion of the coupling sleeve 38 is formed with an annular cylindrical ring 39 of reduced outer diameter which projects upwardly through the apertures *44a* and *46a*. The upper end of the ring 39 is swaged over as at 47 against the upper surface of the washerlike member 46 to firmly secure the sleeve 38 to the lower cup member 36 in coaxial alignment therewith.

As best shown in FIGS. 1 and 3, the outer surface of the coupling sleeve 38 may comprise a plurality of angularly disposed, planar sides arranged to form a hexagonally shaped cross section so that a wrench or tool may be applied thereto to prevent rotation of the sleeve when the device is being mounted or attached. The coupling sleeve is connected at its lower end to an upper wall 45 of the inverted cup-shaped portion *40a* of the base member 40. To this end, the sleeve includes a downwardly projecting cylindrical annular ring 41 of reduced diameter which projects downwardly through a central opening *45a* in the wall 45, and the lower end of the ring 41 is swaged over and radially outward as at 53 against the underside of the wall, as best shown in FIG. 2.

From the foregoing, it can be seen that the coupling sleeve 38 interconnects the lower cup member 36 of the housing 32 with the base member 40. The base member 40 is adapted to support the device for mounting on an apparatus, such as an engine or the like, the speed of which is to be monitored or controlled, and to this end, the base flange *40b* includes a plurality of spaced apart outer holes 49 (FIG. 1). When required for a specific installation, the flange may be provided with a plurality of spaced apart, inner holes 53 (FIG. 1) for accommodating rivets 52 to hold an annular pilot ring 54 mounted on the underside of the flange in coaxial alignment with the opening *45a* in the upper wall 45 of the base member 40. The pilot ring aids in aligning the shaft of the device with the shaft of an engine or other component, the speed of which is to be monitored; however, in many installations the pilot ring may not be required.

A pair of ball or roller bearing assemblies 60 are seated in the central bore 55 extending longitudinally through the coupling sleeve 38 in order to rotatively support a main rotor shaft 70. The shaft 70 extends upwardly from the cup portion *40a* of the base member 40 and through the opening *45a* into the coupling sleeve 38. The bearings 60 support the shaft for free rotation in the sleeve 38, and the upper portion of the shaft extends upwardly through the openings *44a* and *46a* in the lower cup wall 44 and washer 46, respectively, in coaxial alignment with the longitudinal axis of the housing 32.

Preferably, the bearings 60 are slip fitted into the bore 55 of the coupling sleeve 38, and the lower end of the coupling is sealed around the shaft 70 to prevent the loss of lubricant and prevent the entry of contaminants into the device by means of a sealing gasket 56. The bearings are separated from each other by a small spacer washer 61 and retained against upward movement in the bore 55 by a collar 63 and retaining washer 65 secured to the end wall of the lower cup member 36 by a plurality of cap screws *65a*. In the lower end of the bore 55 below the bearings 60, a washer 57 and a spring washer 58 are provided to exert a pre-loading and thrust against the bearings and hold the bearings firmly against the upper collar 63. Upward movement of the shaft 70 within the inner races of the bearings 60 is restrained by a snap ring 59, which is seated in an annular groove 70*a* formed in the shaft. The lower end portion of the shaft 70 which projects downwardly into the cup portion 40*a* of the base 40 is formed with another annular groove 70*b* and flatted exterior surfaces 72 adjacent the lower end in order to facilitate connection of the shaft to a flexible coupling 74, the lower end of which is adapted to be drivingly engaged with a rotating shaft or the like (not shown), the speed of which is to be monitored or controlled by the device 30.

In accordance with the invention, the lower cup 36 provides an enclosure for a centrifugally actuated, speed responsive governor mechanism 80 which is mounted on the upper portion of the shaft 70 for rotation therewith. The centrifugal governor mechanism includes a base comprising a grommetlike, centrally disposed, annular sleeve 82 mounted on the upper end portion of the shaft and pinned thereto by a radial pin 84. The grommet or sleeve 82 supports a channel-like saddle or base member 86 having a bottom web portion 86*a* extending transversely of the shaft in a plane normal thereto and a pair of upwardly extending, opposite side flanges 86*b* disposed on opposite sides of the shaft. The web 86*a* is formed with a central aperture 87 in order to receive an upwardly projecting annular stem or ring 82*a* of reduced diameter formed on the grommet or sleeve 82, and the upper end of the stem or ring is swaged over against the upper surface of the web, as at 88 (FIG. 2), thus locking the saddle 86 and grommet 82 permanently together against relative rotation.

The side flanges 86*b* of the saddle 86 provide support for a pair of centrifugally actuated, pivotally mounted, radially outwardly extending counterweights 90 disposed diametrically on opposite sides of the shaft 70. Each counterweight 90 is mounted for free pivotal movement on a pin 92 which extends between opposite side flanges 86*b* and has its opposite ends projecting into suitable openings formed therein. As best shown in FIG. 3, the opposite outer end portions of each pin are formed with an annular groove 92*a*, and a snap ring 93 is seated in each groove to bear against the respective outside surface of a saddle side flange 86*b* and the pins are thus restrained against longitudinal movement. Each pin supports a hollow cylindrical sleeve 94 journaled thereon for free rotation and, preferably, the sleeves are fabricated of a synthetic plastic biasing material, such as that sold under the trade name "Teflon." Each sleeve 94 extends through an appropriate aperture 95 provided in the associated centrifugal counterweight 90 and a pair of spring lock washers 94*a* are provided on each sleeve to bear against opposite side faces of the counterweight and thereby prevent relative movement between the sleeve and counterweight.

Preferably, the counterweights 90 are shaped as shown in FIGS. 2 and 5, and the upper end portions of the counterweights are biased radially inwardly toward the shaft 70 by a pair of coil springs 98 disposed on opposite sides of the weights and extending transversely of the rotor shaft 70.

In order to interconnect opposite ends of the springs 98 with each counterweight 90, a laterally extending pin 100 extends through an appropriately located opening formed in the body of the weight adjacent the upper end portion thereof, and each pin includes an annular flange (FIG. 3) bearing against one side face of the counterweight and a flange formed by a swaging process bearing against the opposite side face of the counterweight so that the pin will not move longitudinally, once inserted and the second flange is formed. Opposite end loops 98*a* (FIG. 5) of each spring 98 are hooked around the opposite end portions of each pin, and the springs are thus spaced on opposite sides of the shaft and counterweights. As best shown in FIGS. 2 and 3, each pin 100 projects transversely outwardly from opposite side faces of its counterweight 90 generally parallel with the mounting pin 92. A pair of annular recesses 100*a* of reduced diameter are formed in each pin, spaced a short distance inwardly from the outer ends in order to accommodate the end loops 98*a* of the respective springs 98 connected thereto, and these recesses prevent the end loops of the springs from slipping off and becoming disengaged from pins during operation of the governor mechanism as the springs are elongated and contracted.

The inner edge of each counterweight 90 is formed with an inwardly projecting tooth member 90*a* adjacent the lower end thereof, and immediately above the tooth is formed a groove 91 having a profile similar in shape to that of the tooth member. The teeth 90*a* and grooves 91 provide for continuous engagement between the respective counterweights and a central switch actuating sleeve 106 which is slidably mounted on the upper end portion of the rotor shaft 70 for axial translation thereon in response to the shaft speed. The switch actuating sleeve includes a pair of axially spaced apart, outwardly projecting, annular ridges 106*a* and 106*b* adjacent the lower end thereof, and these ridges are of a tooth-shaped profile in cross section to match that of the teeth 90*a* and grooves 91 on the counterweights. The ridges 106*a* and 106*b* are separated by an annular groove 107 also having a tooth-shaped profile and the tooth members 90*a* of the counterweights extend into the groove from diametrically opposite directions while the annular ridge 106*a* of the sleeve projects outwardly into engagement in the grooves 91 on the respective counterweights. The lower annular ridge 106*b* on the actuator sleeve engages the lower side edge of the tooth projections 90*a* and, accordingly, both counterweights 90 are in continuous meshing engagement with the lower end portion of the axially translatable switch actuating sleeve 106.

As the shaft 70 rotates, centrifugal force acting on the counterweights 90 causes them to be urged radially outwardly of the shaft in opposition to the inward forces exerted by the biasing springs 98. As the counterweights pivot about their respective mounting pins 92, due to centrifugal force, the tooth projections 90*a* thereon which are engaged in the groove 107 of the actuating sleeve 106 cause the sleeve to move upwardly on the shaft 70 in response to increases in shaft speed. As the shaft speed 70 is further increased, the sleeve moves further upwardly on the shaft, and this movement is continuously opposed by the tension forces exerted by the springs 98 on the respective counterweights 90 tending to bias the weights inwardly.

When the rotor shaft 70 is at rest or rotating at a relatively slow shaft speed, the centrifugal force acting radially outwardly upon the weights is not great enough to overcome the biasing forces of the springs 98 which oppose the centrifugal force caused by shaft rotation and, accordingly, at low speeds the spring forces are sufficient to cause the weights to remain in a position shown in FIG. 2 with their inner edges in contact against or touching the upper portion of the sleeve 106. As the shaft speed increases, the centrifugal forces acting radially outwardly on the counterweights 90 increase proportionately and exert sufficient tension forces on the springs causing them to become elongated and permitting the weights to pivot radially outwardly about their respective pins 92 in an amount proportional to the shaft speed. As this occurs, the springs 98 are elongated in tension as represented in FIG. 5 and the sleeve 106 moves upwardly on the shaft 70 in an amount generally proportional to the increase in shaft speed. Further increases in shaft speed cause further upward movement of the sleeve 106 and, conversely, reductions in shaft speed result in downward movement of the sleeve on the rotor shaft.

In order to limit or set a maximum amount of upward translation of the switch actuating sleeve 106 on the rotor shaft 70 and thereby prevent the tooth members 90a from becoming disengaged from engagement in the annular groove 107 on the lower portion of the actuating sleeve, each counterweight 90 is provided with an outwardly extending, stop projection or tooth 90b adjacent its outer edge at the lower end. The stop projections 90b are adapted to engage the opposite outer ends of the saddle web 86a and thereby limit the pivotal movement of the counterweights about their pins 92 and the amount of upward travel of the actuating sleeve on the rotor shaft 70. FIG. 5 illustrates the governor mechanism 80 in an operating condition wherein the speed of the shaft 70 is sufficient to elongate the springs 98 to a considerable degree and, should the shaft speed be further increased, the stop projections 90b will soon engage the opposite ends of the web 86a and limit the pivotal movement of the counterweight as well as further upward travel of the switch actuating sleeve 106 on the shaft, regardless of how much faster the shaft is then rotated.

Referring specifically to FIGS. 2 and 5, it will be seen that the switch actuator sleeve 106 is axially translatable along the upper portion of the rotor shaft 70 in response to the speed of the shaft. In FIG. 2, the actuator sleeve is illustrated in a low speed position wherein the inner edges of the counterweights 90 are actually pressed against diametrically opposite sides of the actuator sleeve by the force exerted by biasing springs 98. As the rotor shaft 70 increases in speed, the counterweights 90 begin to pivot outwardly in opposite directions about their respective pivot pins 92 and, as this occurs, the actuator sleeve 106 is moved upwardly on the shaft 70 from the position of FIG. 2 toward a higher speed position as represented typically in FIG. 5. The rate of movement of axial translation of the sleeve 106 on the shaft 70 as the speed increases is governed by the strength of the springs 98 and the mass of the counterweights 90.

Upward movement of the switch actuator sleeve 106 is adapted to actuate a switch 110 which is mounted in the upper cup 34 of the housing 32 in axial alignment with the rotor shaft 70. The switch 110 includes a downwardly protruding actuator button 110a adapted to be engaged by the upper end of the switch actuator sleeve 106 which includes a cap member 112 shaped like an inverted cup. The switch actuator button 110a is movable along an axis coextensive with the rotational axis of the shaft 70 and is biased to protrude downwardly from the casing or body of the switch (FIG. 2) when in a normal or nonactuated position. When the actuator sleeve 106 moves upwardly in response to an increase in speed of the rotor shaft 70, the upper surface of the cap member 112 engages the switch actuator button 110a forcing it upwardly to actuate the switch. Conversely, downward travel of the sleeve 106, in response to a decrease in shaft speed, permits the switch to return to a normal unactuated position as the cap 112 moves downwardly out of engagement with the button 110a.

The switch 110 can be of either the normally open or the normally closed variety, and may include several or only a single pole in order to accomplish the desired switching function for a given application. Regardless of the specific type of switch used, the vertical position thereof on the shaft axis relative to the lower cup 36 controls the r.p.m. at which the switch is actuated by the upper cap 112 on the switch actuator sleeve 106.

In order to adjustably support the switch 110 in the upper cup 34 and provide for selective movement of the switch to different positions, a switch support assembly 120 is provided, as shown in enlarged detail in FIGS. 6 and 7. The switch support assembly depends downwardly from the upper wall 122 of the upper cup 34 which is formed with an enlarged central opening 122a therein in alignment with the axis of the rotor shaft 70. A washerlike, stiffening member 124 is secured to the inside surface of the wall 122 and the washer 124 is formed with a central opening 124a axially aligned with the opening 122a but smaller in diameter.

The switch support assembly 120 includes an L-shaped support bracket 126 having a downwardly depending leg 126a offset to one side of the axis of the rotor shaft 70, and the body of the switch 110 is bolted to this leg by a plurality of bolts 128. The bracket 126 includes a leg 126b transverse to the axis of shaft 70 and having a central aperture 127 therein in coaxial alignment with the axis of the rotor shaft and the opening 124a in the washer 124. An upper, grommetlike, elastic stop nut 130 having a hexagonally shaped upper portion 130a, a cylindrical lower end portion 130b, and an internal threaded bore extending axially therethrough is mounted on the washer 124 with the lower end portion 130b projecting downwardly through the opening 124a. The lower extremity of the cylindrical portion 130b is crimped over and radially outwardly along the undersurface of the member 124, as at 131, to secure the grommet or stop nut 130 against rotation in the cup 34. A lower, grommetlike member 132 having an axial bore therethrough is seated in the opening 127 provided in the transverse leg 126b of the L-shaped bracket 126.

In order to mechanically interconnect the upper and lower grommets 130 and 132 and urge these members toward one another, there is provided a spring assembly 135 including an upper, transversely extending, leaf spring 134 which is coupled at its outer ends to a similar lower leaf spring 136. The upper leaf spring 134 is formed with a central aperture 134a, through which the lower cylindrical portion 130b of the upper grommet 130 extends, and the lower leaf spring 136 includes a central aperture 136a through which the midportion of the lower grommet 132 extends. The outer ends of the upper and lower springs are pivotally connected to each other by pin members 138 and, accordingly, the springs are free to pivot relatively to one another so that as the springs normally tend to straighten or flatten out, the lower grommet 132 and, consequently, the switch 110 are biased upwardly toward the top wall 122 of the upper cup 34.

In order to hold the grommets 130 and 132 in selected spaced apart relation against the normal biasing forces exerted by the spring assembly 135, a threaded adjusting rod 140 is mounted in the threaded axial bore of the upper grommet 130. The lower end of the adjusting rod 140 extends downwardly from the upper elastic stop nut 130 and includes a lower end or tip projection 140a of smaller diameter which is designed to extend into and seat in the axial bore of the lower grommet 132. The rod 140 is larger in diameter than the central bore of the grommet 132, and the lower end projection 140a forms an annular shoulder on the rod which bears downwardly against the upper surface of the lower grommet 132. The upper end of the adjusting rod 140 is accessible from the exterior of the housing 32 and includes a socket for an "Allen" wrench or a transverse slot 140b adapted to receive a screwdriver or the like for threadedly adjusting the rod in the upper grommet 130.

As the adjusting rod 140 is turned by a wrench or screwdriver in a clockwise direction, the rod moves longitudinally downward relative to the elastic stop nut 130 and forces the lower grommet 132 downwardly. If the rod is turned in the opposite direction, it is retracted upwardly and the spring assembly 135 moves the lower grommet and switch upwardly. The switch 110 is thus movable along the longitudinal axis of the housing 32 toward or away from the governor assembly 80 in the lower cup 36 and, accordingly, the shaft speed at which the switch is actuated by the sleeve 106 can be adjusted and accurately controlled. The spring members 134 and 136 combine to continuously urge the switch 110 and lower grommet 132 upwardly against the shoulder formed adjacent the lower end of the adjusting rod 140. These springs extend transversely of the longitudinal axis of the rod and prevent rotation of the switch when it is engaged by the upper cap 112 on the actuator sleeve 106 which rotates with the shaft 70. In addition, the spring assembly 135 exerts upward thrust on the adjusting rod 140 and aids the elastic stop nut in preventing the rod from inadvertently rotating in the stop nut. Accordingly, the position of the switch 110 does not change during operation, once it is set and adjusted in the desired position by a screwdriver or wrench applied to the upper end of the adjusting rod.

From the foregoing, it can be seen that the vertical or axial position of the switch 110 in the housing is selectively adjustable from the exterior of the housing by means of turning the exposed upper end of the adjusting rod 140. By adjusting the rod in clockwise direction, the r.p.m. of the shaft 70 at which the switch 110 is actuated, is lowered, and by opposite rotation of the adjusting rod, the r.p.m. of the shaft 70 at which the switch actuation occurs, is increased. The elastic stop nut 130 and spring assembly 135 positively prevent the position of the switch from inadvertently changing or moving out of adjustment, once it is in a selected position, and thus switch actuation will repeatedly occur at a precise shaft speed, even though the shaft speed is continuously increasing and decreasing. The precise governing speed at which actuation of the switch 110 occurs is readily adjustable without requiring disassembly of the housing 32 and adjustments can be accurately made while the rotor shaft 70 is turning. The new and unique switch mounting assembly 120 provides for precise and accurate control of the shaft speed at which switch actuation occurs, and as wear on the various components in the device occurs, adjustments can be made from time to time to compensate. The device 30 is relatively simple in construction and is easy to service. The upper cup 34 can be easily disassembled from the lower cup 36 so that the switch 110 or governor assembly 80 is exposed for service or replacement.

Referring momentarily to FIGS. 1 and 3, electrical connections to and from the switch 110 are preferably connected to spaced apart terminals A, B, and C, which are mounted on the upper wall 122 of the upper cup 34. The terminals are insulated from the upper cup member and perform the additional function of helping to secure the stiffening washer 124 to the upper end wall of the upper cup member. The switch includes a plurality of lugs 110*b* and electrical leads (not shown) are connected between the terminals A, B, C, and these lugs.

Referring now to FIGS. 9 through 21, therein is illustrated another embodiment of a new and improved speed responsive switching device 230 in accordance with the invention, and especially adapted to provide for multiple switch actuation at several different shaft speeds. The device 230 includes an enclosure or housing 232 comprising an upper cup member 234 and a lower cup member 236. The cup members are adapted to be fitted together to form the housing 232, and to this end, the upper cup includes an enlarged, internal, annular shoulder 234*a* around its lower open end adapted to receive the upper open end of the lower cup 236. A plurality of radially inwardly extending, evenly radially spaced apart screws 242 are mounted on the lower cup adjacent the upper open end and these pins are adapted to extend through appropriately spaced, L-shaped slots 234*b* formed at the lower edge of the lower cup. Rotation of the cup 234 on the lower cup 236 with the pins engaged in the slots, seals the cup members together with the upper end of the lower cup member seated against the shoulder 234*a*, as described in connection with the previous embodiment.

The lower cup 236 includes a bottom wall member 244 and a washerlike stiffening member 246 mounted on the interior surface thereof. A lower, tubular coupling sleeve 238 is connected to the lower wall members 246 and 244 of the lower cup 236 in a manner similar to that previously described. To this end, the upper end of the tubular coupling 238 includes an upwardly projecting annular cylindrical ring 239 of reduced diameter which extends through central apertures 244*a* and 246*a* in the bottom walls of the lower cup and washer, and the upper end of the ring 239 is swaged over, as at 247, to secure the coupling sleeve 238 tightly against relative rotation on the housing. The coupling 238 may include a plurality of planar, angularly intersecting, outer surfaces forming a hexagonal external shape in cross section in order to facilitate the attachment of a wrench or other tool. The lower end of the tubular coupling 238 is threaded as at 241 to facilitate coupling of the device 230 to a speedometer cable, housing, meter, or other component.

The upper cup 234 is similar in construction to the lower cup and includes an upper wall 222 and a washer-like inner stiffening plate 224 secured thereto. The upper wall members 222 and 224 include central apertures 222*a* and 224*a*, respectively, which are in concentric alignment with the apertures 244*a* and 246*a* in the bottom wall members of the lower cup, and the opening 224*a* is adapted to receive a downwardly projecting ring portion 301 of an upper coupling sleeve 338 which is adapted to couple the upper end of the device 230 to another component by means of an exteriorly threaded portion 339. The coupling member 338 is similar to the coupling unit 138 and the lower ring 301 is swaged over as at 302 to secure the coupling in place and hold it against relative rotation on the upper cup 234.

The coupling sleeves 238 and 338 provide support for the opposite ends of main rotor shaft 270 which is in coaxial alignment with the longitudinal, central axis of the housing 232. A ball or roller bearing assembly 260 is slip fitted into the bore 255 of each of the respective couplings 238 and 338 to support the rotor shaft 270. The lower end of the rotor shaft may be flatted as at 272 to facilitate coupling of the shaft with other shafts or instruments, the speed of which is to be monitored or controlled, and the upper end of the shaft may be hollowed out and slotted as at 272*a* for connection to a shaft or instrument. In a typical application of the device 230, the shaft 270 is connected at one end to a speedometer cable and at the other end to an indicating instrument, such as an odometer, or the like, and this is possible because the rotor shaft extends straight through the opposite ends of the housing 232.

Upper and lower washers 341 and 342 are seated in the respective couplings 238 and 338 around the rotor shaft, which is restrained against longitudinal movement during rotation by means of several spaced apart, annular grooves 270*a*, 270*b*, and 270*c* formed in the shaft, each groove being adapted to accommodate a snap ring 271 inserted therein.

The device 230 includes a centrifugally actuated governor mechanism 280 which is similar in many respects to the governor mechanism 80, previously described, and for this reason identical components of the two governor assemblies will have the same reference numerals except that the latter embodiment will include an additional prefix numeral 2. The essential difference between the former and latter governor mechanisms lies in the fact that the latter includes an additional pair of biasing springs 299 extending between the pins 200 on the respective counterweights 290. The springs 299 are parallel with the springs 298 and are adapted to exert additional biasing forces between the counterweights only after a predetermined shaft speed is obtained.

Each of the secondary biasing springs 299 includes at least one elongated end loop 299*a* which normally extends around but outwardly beyond the pin 200 to which it is attached so that no biasing force is exerted by the spring between the counterweights 290 until the shaft 270 has achieved sufficient speed to cause the upper end portions of the weights to move apart into an intermediate position (as represented in FIG. 18) wherein the pins 200 are at the outer extremities of the end loops 299*a*. Thus, during a first speed range between a minimum and intermediate shaft speed, the counterweights 290 are biased toward one another by the pair of springs 298, and when the shaft speed increases above the intermediate speed into a second and higher speed range, the second pair of biasing springs 299 come into action and add biasing forces in opposition to the centrifugal force acting on the counterweights 290. Pivotal movement of the counterweights 290 about their respective pivot pins 292 in the low speed range is opposed by the springs 298 and in the higher speed range opposition force is supplied by both pairs of biasing springs 298 and 299.

As in the governor mechanism previously described, pivotal movement of the counterweights 290 causes axial translation of a switch actuator sleeve 306 slidably mounted on the rotor shaft 270, but movement of the sleeve upwardly on the shaft in response to increases in r.p.m. is at a first rate when the shaft r.p.m. is in the low range with the springs 298 alone biasing the counterweights, and at a second lower rate when the shaft r.p.m. is in the high range and centrifugal force on the counterweights is opposed by the forces exerted by both pairs of springs 298 and 299. The rate of axial translation of the actuator sleeve 306 on the shaft 270 in the low speed range is controlled by the spring constant of the springs 298, and when the shaft speed increases into the second speed range, the spring constant of the springs 299 also becomes a factor in determining the rate of movement of the sleeve on the rotor shaft.

The governor mechanism 280 thus has a dual speed range, and increases in r.p.m. of the shaft 270 below a certain selected crossover r.p.m. causes the actuator sleeve 306 to move at one rate for a given increment of increase or decrease in shaft speed. At speeds above the crossover r.p.m. in the second higher speed range, the springs 299 add additional biasing forces, and increments of increase or decrease in shaft speed in this range cause the actuator 306 to move at a second and different rate for each given increment of change in shaft r.p.m. The crossover r.p.m. at which the rate change occurs is the shaft speed at which initial stressing of the springs 299 occurs because the elongated end loops 299*a* start to exert force on the pins 200.

FIGS. 14 and 15 illustrate the governor mechanism 280 when the r.p.m. of the rotor shaft 270 is low, and relatively little centrifugal force is exerted on the counterweights 290. As the r.p.m. increases, centrifugal force on the counterweights increases and the springs 298 begin to elongate, as shown in FIGS. 17 and 18. FIGS. 17 and 18 represent the mechanism in an operative condition wherein the shaft r.p.m. is in the lower range and the actuator sleeve 306 has moved upwardly on the rotor shaft from the position shown in FIG. 10. A further increase in shaft speed past the crossover r.p.m. into the second speed range causes the second pair of biasing springs 299 to become elongated, as shown in FIGS. 19 and 20, and exert biasing forces in opposition to centrifugal forces acting on the counterweights 290. When a selected maximum speed is reached, further pivotal movement of the counterweights 290 is limited by engagement of stop projections 290*b* at the outer lower corners of the counterweights against the opposite ends of the web 286*a* of the base member 286. The switch actuator sleeve 306 is somewhat different from the sleeve 106 previously described in that the latter actuator sleeve is adapted to operate a plurality of separate switches which are positioned radially outward of the shaft rather than in axial alignment, as in the previously described embodiment.

In accordance with the present invention, the speed responsive switching device 230 includes at least two or more switches, such as the switches 310 and 410, which are spaced radially outwardly from the shaft 270 and which are supported from the upper end wall members 222 and 224 of the upper cup 234. The switch members 310 and 410 are each supported with a support mechanism 320 identical to the mechanism 120 previously described and, accordingly, these support mechanisms will not be described in detail. In response to turning of the adjusting rod 340 in each support mechanism 320, the switches 310 and 410 are individually movable along axes parallel with the axis of the main rotor shaft 270. The threaded adjusting rods are adjustable from the exterior of the housing 232 to move the respective switches toward or away from the lower cup member 236. Accordingly, as in the prior embodiment, the speed of the shaft 270 at which each of the switches 310 and 410 is actuated, is selectively adjustable as desired.

The switches include operator buttons 310*a* and 410*a*, respectively, which are adapted to be engaged by a radial switch actuator mechanism 400 mounted on the upper end of the switch actuator sleeve 306. The radial actuator 400 is best shown in FIGS. 10, 17, and 19 and includes an inverted cup-shaped central portion 402 having a central aperture 402*a* to accommodate the shaft 270. The radial actuator includes a pair of arms 404 and 406 extending radially outward of the central portion 402 for actuating the respective siwtches 310 and 410. The cup-shaped central porion 402 houses a bearing assembly 408, the inner race 409 of which is press fitted onto a sleeve portion 306*b* of reduced diameter formed at the upper end of the switch actuator sleeve 306. Rotation of the actuator 400 with the sleeve 306 is prevented by a fixed bracket 421 (FIG. 13) having a vertical, inwardly extending flange 421*a* and webs secured to the sidewall of the upper cup 234 by rivets 423 (FIG. 17). A grommet 416 of plastic material is mounted on the outer end of the arm 404 and includes a radial slot to accommodate the vertical flange 421*a* of the bracket 421, thereby preventing the arm from rotating about the shaft axis (FIG. 13), yet permitting vertical movement thereof. The bearing assembly 408 provides a rotative interconnection between the nonrotating actuator 400 and the actuator sleeve 306 which normally rotates with the rotor shaft 270.

The radial arm 404 supports a switch contactor 412 (FIG. 16) forming the upper end or head of a pin 414 and adapted to move toward and away from the operator button 310*a* of the switch 310. The pin 414 is mounted for axial sliding movement in the axial bore of the grommet 416 which includes an annular lower flange portion bearing against the underside of the arm 404. The pin 414 is biased upwardly on the arm 404 by a spring 418 interposed between the pin head 412 and the arm, and maximum upward movement of the pin is limited by a snap ring 419 seated in a groove 414*a* formed adjacent the lower end of the pin.

The opposite radial arm 406 supports a second switch contactor 430 adapted to move toward and away from the switch button 410*a* of the switch 410 to actuate this switch in response to upward travel of the sleeve 306, as the shaft speed increases. The vertical positions of the switches 310 and 410, respectively, with respect to the housing are adjustable so that as the actuator sleeve 306 moves upwardly on the rotor shaft 270 in response to increasing speeds, the button 412 on the pin 414 engages the switch operator 310*a* actuating the first switch 310 at a selected, relatively lower, r.p.m. The spring 418 urges the button 412 upwardly on the arm 404 and is of sufficient strength to overcome an internal spring in the switch 310 and actuate the switch, and upon a further increase in the speed of the shaft 270 after the first switch 310 has been actuated, upward movement of the sleeve 306 and actuator assembly 400 continues. During this interval, the spring 418 is further compressed, as shown in FIG. 21, and, finally, when the arm 406 moves far enough upwardly so that the button 430 engages the operator 410*a*, the second switch 410 is actuated (FIG. 19) at a somewhat higher r.p.m. than the first switch.

Normally, the positions of the respective switches 310 and 410 are adjusted so that the first switch 310 will be actuated when the governor assembly 280 is operating within the first or lower speed range, as previously described, and the second switch 410 will be actuated after the shaft speed has passed beyond the crossover r.p.m.

into the second or higher speed range. However, the position of the switches can be adjusted so that both switches will be actuated while the governor is operating at different or the same shaft speed within one speed range of the governor assembly, either high or low. Normally, once the shaft speed is sufficiently high so that both switches have been actuated as described and the shaft speed then begins to decrease, the switch 410 will first return to its normal condition as the actuator assembly 400 moves downwardly, and then the switch 310 will return to its normal condition.

While the device 230 as illustrated and described includes only two switches, it is to be understood that more than two switches could be employed. The position of each switch is individually adjustable by means of an adjusting rod 340 so that the precise r.p.m. at which the switch is actuated can be accurately controlled and maintained. The dual range governor assembly 280 is useful in many applications wherein it is desirable to have a switch actuator movable at a first rate in response to r.p.m. changes in a low range and at a second, different rate when the shaft speed increases above a selected r.p.m. into a second or higher range. By providing a multiple switching capability plus a dual range governor assembly and a straight through shaft construction, the device 230 is extremely flexible in application for a variety of different functions.

While there have been illustrated and described two embodiments of the present invention, it will be appreciated that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. In a switching device, the combination comprising a switch housing having an outside wall, a switch mounted in said housing, and a switch mounting assembly for supporting said switch, said switch mounting assembly including a first member mounted on said wall and having a portion accessible from the outside surface of said wall and a second member spaced inwardly of said wall for supporting said switch, spring means resiliently interconnecting said first and second members for movement toward and away from one another, said first member and said spring means forming means for restraining relative rotation of said members and a single adjusting member extending between said first and second members having an outer end accessible from the exterior of said housing, said adjusting member including means for rotating said adjusting member to move said first and second members relative to each other for exerting a force between said members opposite that exerted by said spring means.

2. The device of claim 1 wherein said first member includes a threaded opening extending therethrough and said adjusting member comprises a rod threadedly engaged in said opening with an inner end bearing against said second member.

3. The device of claim 1 wherein said spring means includes first and second leaf springs extending radially outward of an axis extending between said first and second members, said leaf springs extending outwardly of respective ones of said first and second members and pivotally connected together adjacent their outer ends.

4. The device of claim 3 wherein each leaf spring extends outward of said axis in opposite directions and the opposite ends of each leaf spring are pivotally connected to the other.

5. The device of claim 4 wherein each leaf spring is restrained longitudinally by the other leaf spring, thereby forming a concave curved surface facing said other spring and thereby normally biasing said first and second members toward one another.

6. The device of claim 3 wherein said adjusting member comprises an elongated threaded rod extending along said axis.

7. The device of claim 5 wherein each of said leaf springs includes an opening at the center thereof and said first and second members include hollow tubular portions extending through the openings in said first and second leaf springs respectively.

8. The device of claim 7 wherein said adjusting member includes a threaded rod extending through the tubular portion of said first member.

9. The device of claim 3 including speed responsive means movable toward and away from said switch along said axis.

10. A speed responsive device comprising housing means having spaced opposite walls, a pair of axially spaced bearing devices mounted on said walls, a shaft extending longitudinally through said housing and rotatably supported in said bearing devices, a speed responsive device fixed for rotation with said shaft, actuator means mounted on said shaft and engaged by said speed responsive device to move axially of said shaft in response to changes in speed thereof, a plurality of switches in said housing means supported from one of said walls and spaced radially outward of said shaft, said switches each including an operator engageable by said actuator means to actuate said switch at a selected speed of said shaft, and an adjustable mounting means for each of said switches, each of said mounting means including a single adjusting member having an outer end accessible from the exterior of said housing means for rotation thereof for bodily moving said switch toward or away from one of said housing walls in a direction parallel of said shaft, and spring means for biasing said switch in a direction opposing said adjusting member, said mounting means and said spring means including means preventing rotation thereof relative to said one wall.

11. The device of claim 10 wherein said actuator means includes a hub around said shaft and a pair of radially outwardly extending arms, a first contactor fixedly mounted on one of said arms for engagement with the operator of one switch, a second contactor movably mounted on the other of said arms for engagement with the operator of said other switch, and spring means biasing said second contactor from said arm in a direction parallel of said shaft toward said switch operator.

12. The device of claim 10 wherein each of said adjustable mounting assemblies includes a first member on said housing wall and a second member spaced therefrom supporting said switch, spring means resiliently interconnecting said first and second members, said adjusting member comprising a threaded rod extending between said first and second members and exerting a force therebetween in opposition to the force exerted by said spring means.

13. The device of claim 10 wherein said speed responsive device comprises a base extending outwardly of said shaft and rotatable therewith, a pair of centrifugal weights pivotally mounted on said base on opposite sides of said shaft, said weights including means engaging said actuator means for causing axial translation thereof in response to the pivotal movement of said weights, first spring means extending between said weights continuously urging said weights to pivot in opposite directions about their respective pivot axes in opposition to the pivotal movement of said weights caused by centrifugal force upon rotation of said shaft, and second spring means extending between said weights for supplementing the force of said first spring means, said second spring means including a lost motion connection whereby spring force between said weights is initiated upon said shaft reaching a predetermined speed of rotation.

14. A governor mechanism comprising a rotating shaft, a base extending radially outward of said shaft and rotatable therewith, a pair of centrifugal weights pivotally mounted on said base on opposite sides of said shaft, actuator means mounted on said shaft for axial translation thereon in response to changes in the speed of rotation of said shaft, said weights including means engaging said actuator means for urging axial translation thereof in one direction as said shaft speed increases, first spring means between said weights continuously urging said weights to pivot about their respective pivot axes in a direction urging said actuator opposite said one direction, second spring means between said weights engageable to exert force therebetween only after said shaft reaches a predetermined minimum speed of rotation, means for supporting said shaft including a housing having a wall normal to said shaft, a switch mounted in said housing for actuation by said actuator means, and a switch mounting assembly for adjustably supporting said switch from said housing wall, said switch mounting assembly including a first member mounted on said wall and having a portion accessible from the outside surface of said wall and a second member spaced inwardly of said wall for supporting said switch, spring means resiliently interconnecting said first and second members for movement toward and away from one another, said spring means and said first member forming means restraining relative rotation of said member, and a single adjusting member extending between said first and second members having an outer end accessible from the exterior of said housing, said adjusting member including means for rotating said adjusting member to move said first and second members relative to each other for exerting a force between said members opposite that exerted by said spring means.

15. The governor mechanism of claim 14 wherein said second spring means is operable to aid said first spring means above said minimum speed of shaft rotation.

16. The governor mechanism of claim 14 including a pin on each of said weights remote from and parallel to the pivot axis thereof, said first and second spring means comprising a pair of parallel elongated coil springs extending transversely across said shaft and having their opposite ends connected to said pins on said weights.

17. The governor mechanism of claim 16 wherein said second spring means includes an elongated loop at one end having an outer end extending outwardly beyond the pin on one of said weights whereby said second spring means is under tension stress only after said pins on said weights have moved apart a predetermined amount in response to the centrifugal force due to rotation of said shaft.

References Cited

UNITED STATES PATENTS

| | | | |
|---|---|---|---|
| 1,559,872 | 11/1925 | Hills et al. | 200—80 X |
| 2,758,172 | 8/1956 | Kromholz | 200—80 X |
| 2,779,836 | 1/1957 | Williams | 200—80 X |
| 2,793,023 | 5/1957 | Gaubatz | 73—537 X |

FOREIGN PATENTS

| | | |
|---|---|---|
| 714,094 | 8/1931 | France. |
| 880,929 | 10/1961 | Great Britain. |

ROBERT K. SCHAEFER, Primary Examiner

D. SMITH, Jr., Assistant Examiner

U.S. Cl. X.R.

74—537